United States Patent
Park et al.

(10) Patent No.: US 10,433,028 B2
(45) Date of Patent: Oct. 1, 2019

(54) APPARATUS AND METHOD FOR TRACKING TEMPORAL VARIATION OF VIDEO CONTENT CONTEXT USING DYNAMICALLY GENERATED METADATA

(71) Applicant: Electronics and Telecommunications Research Institute, Daejeon (KR)

(72) Inventors: Won Joo Park, Daejeon (KR); Jeong Woo Son, Daejeon (KR); Sang Kwon Kim, Daejeon (KR); Sun Joong Kim, Sejong-si (KR); Sang Yun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/820,692

(22) Filed: Nov. 22, 2017

(65) Prior Publication Data

US 2018/0213299 A1    Jul. 26, 2018

(30) Foreign Application Priority Data

Jan. 26, 2017    (KR) .................. 10-2017-0012415

(51) Int. Cl.
*H04N 21/84*    (2011.01)
*H04N 21/25*    (2011.01)
(Continued)

(52) U.S. Cl.
CPC ......... *H04N 21/84* (2013.01); *G06F 16/3331* (2019.01); *G06F 16/71* (2019.01);
(Continued)

(58) Field of Classification Search
CPC .. H04N 21/84; H04N 21/2353; H04N 21/251; H04N 21/26603; G06F 17/30657; G06F 17/30858
See application file for complete search history.

(56) References Cited

U.S. PATENT DOCUMENTS 8,260,764 B1 * 9/2012 Gruber .................. G06F 16/951
707/708
2007/0156726 A1 * 7/2007 Levy ........................ G06F 21/10
(Continued)

FOREIGN PATENT DOCUMENTS

KR    10-0828166 B1    5/2008
KR    10-2009-0084486 A    8/2009
(Continued)

OTHER PUBLICATIONS

Korean Office Action dated Feb. 13, 2019 in counterpart Korean Patent Application No. 10-2017-0012415 (5 pages in Korean).

*Primary Examiner* — Mishawn N. Hunter
(74) *Attorney, Agent, or Firm* — NSIP Law (57) ABSTRACT

There are provided an apparatus and method for tracking temporal variation of a video content context using dynamically generated metadata, wherein the method includes generating static metadata on the basis of internal data held during an initial publication of video content and tagging the generated static metadata to the video content, collecting external data related to the video content generated after the video content is published, generating dynamic metadata related to the video content on the basis of the collected external data and tagging the generated dynamic metadata to the video content, repeating regeneration and tagging of the dynamic metadata with an elapse of time, tracking a change in content of the dynamic metadata, and generating and providing a trend analysis report corresponding to a result of tracking the change in the content.

10 Claims, 4 Drawing Sheets

(51) Int. Cl.
  *H04N 21/235* (2011.01)
  *H04N 21/81* (2011.01)
  *G06F 16/71* (2019.01)
  *G06F 16/33* (2019.01)
  *H04N 21/266* (2011.01)
  *H04N 21/234* (2011.01)

(52) U.S. Cl.
  CPC ....... *H04N 21/2353* (2013.01); *H04N 21/251* (2013.01); *H04N 21/26603* (2013.01); *H04N 21/8133* (2013.01); *H04N 21/23418* (2013.01)

(56) References Cited

U.S. PATENT DOCUMENTS

| | | | | |
|---|---|---|---|---|
| 2008/0187279 | A1* | 8/2008 | Gilley | G06Q 30/02 386/250 |
| 2009/0198656 | A1 | 8/2009 | Lee et al. | |
| 2009/0198708 | A1* | 8/2009 | Showalter | G06F 16/24552 |
| 2010/0241626 | A1 | 9/2010 | Lee et al. | |
| 2012/0185066 | A1* | 7/2012 | Kern | G06F 16/5854 700/91 |
| 2013/0031211 | A1* | 1/2013 | Johnson | H04N 21/23103 709/218 |
| 2013/0166580 | A1* | 6/2013 | Maharajh | H04L 65/605 707/758 |
| 2013/0179789 | A1* | 7/2013 | Beyrodt | G06F 16/958 715/730 |
| 2013/0302006 | A1* | 11/2013 | Previti | G06F 16/40 386/224 |
| 2015/0187390 | A1 | 7/2015 | Pacurariu et al. | |
| 2017/0024385 | A1* | 1/2017 | Drake | G06F 16/435 |
| 2017/0169128 | A1* | 6/2017 | Batchu Krishnaiahsetty | H04N 1/32122 |
| 2017/0235451 | A1* | 8/2017 | Ehrlich | G06F 3/0484 715/710 |
| 2017/0251261 | A1* | 8/2017 | James | H04N 21/2393 |

FOREIGN PATENT DOCUMENTS

| | | |
|---|---|---|
| KR | 10-1658002 B1 | 9/2016 |
| KR | 10-2017-0027253 A | 3/2017 |
| WO | WO 2009/113505 A1 | 9/2009 |

* cited by examiner

APPARATUS AND METHOD FOR TRACKING TEMPORAL VARIATION OF VIDEO CONTENT CONTEXT USING DYNAMICALLY GENERATED METADATA

CROSS-REFERENCE TO RELATED APPLICATION

This application claims priority to and the benefit of Korean Patent Application No. 10-2017-0012415, filed on Jan. 26, 2017, the disclosure of which is incorporated herein by reference in its entirety.

BACKGROUND

1. Field of the Invention

The present disclosure relates to an apparatus and method for tracking temporal variation of a video context by tracking metadata of video content that is dynamically generated in accordance with a temporal variation feature.

2. Discussion of Related Art

Nowadays, high-quality content is flooding due to development of video production technologies, personalization of high-performance video production tools, and the like. This trend is expected to continue in the future. Due to the change in the market, development of an application service for partially or entirely reusing previously published video content is being attempted. For this, commercialization of technological development for automatic generation and tagging of metadata related to the published video content is required. Further, there is a need for the video content to utilize data generated after the publication of the content in addition to data initially published by the video content.

Various pieces of metadata may be tagged to an entire video file or a partial clip file of video content, and the corresponding content may be searched for on the basis of the pieces of metadata such that a context of the video content may be utilized for republication of the content, development of a new application service, and the like. For this, research and development for automatically generating metadata related to video content are being carried out in terms of various aspects such as sensor data collection, natural language processing, and image processing.

In relation to the above, in Korean Patent Registration No. 10-0828166 (Title of Invention: Method of extracting metadata from result of speech recognition and character recognition in video, Method of searching video using metadata and Record medium thereof) a moving picture is extracted/separated into frame units in which a screen transition occurs to automatically generate and tag metadata of the moving picture. Also, a speaker's voice is recognized from a corresponding frame image, the voice data is converted into text, and keywords are extracted from the text data that results from the conversion. Also, a technology in which characters are recognized from a corresponding frame image, the previously extracted keywords are searched for from the recognized characters, weighting values are adjusted, metadata and a title are extracted from the keywords and the characters, and metadata based on voice recognition and character recognition from the corresponding moving picture is extracted on the basis of time information of a start shot and an end shot of an initially extracted frame is disclosed.

SUMMARY OF THE INVENTION

Embodiments of the present disclosure are directed to providing an apparatus and method for dynamically regenerating and tagging metadata according to temporal variation by continuously combining external data generated after publication of video content in addition to static data published during generating of the video content.

Further, embodiments of the present disclosure are directed to providing an apparatus and method for tracking context temporal variation of video content with time by tracking metadata of the video content dynamically regenerated and tagged in accordance with temporal variation.

However, objectives to be achieved by the embodiments of the present disclosure are not limited to the above, and the present disclosure may have other objectives.

To achieve the above-described objectives, according to an aspect of the present disclosure, an apparatus for tracking temporal variation of an video content context includes a first metadata generator/tagger configured to generate static metadata on the basis of internal data held during an initial publication of video content and tag the generated static metadata to the video content, an external data collector configured to collect external data related to the video content generated after the video content is published, a second metadata generator/tagger configured to generate dynamic metadata related to the video content on the basis of the collected external data and tag the generated dynamic metadata to the video content, and a dynamic metadata-based video context temporal variation tracker/analyzer configured to repeat regeneration and tagging of the dynamic metadata with an elapse of time, track a change in content of the dynamic metadata, and generate and provide a trend analysis report.

According to another aspect of the present disclosure, a method for tracking temporal variation of an video content context includes (a) generating static metadata on the basis of internal data held during an initial publication of video content and tagging the generated static metadata to the video content, (b) collecting external data related to the video content generated after the video content is published, (c) generating dynamic metadata related to the video content on the basis of the collected external data and tagging the generated dynamic metadata to the video content, and (d) repeating regeneration and tagging of the dynamic metadata with an elapse of time, tracking a change in content of the dynamic metadata, and generating and providing a trend analysis report.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Embodiments of the present disclosure will be described in detail below with reference to the accompanying drawings to allow one of ordinary skill in the art to which the present disclosure pertains to easily practice the present disclosure. However, the present disclosure may be implemented in various other forms and is not limited to the embodiments described herein. To clearly describe the present disclosure, parts unrelated to the description have been omitted from the drawings, and like parts are denoted by like reference numerals throughout the specification. While the description is given with reference to the accompanying drawings, different reference numerals may be given to the same element according to the drawings. Reference numerals are merely provided for convenience of the description, and concepts, features, functions, or effects of each element is not limitedly interpreted by the reference numerals.

Throughout the specification, when a certain part is described as "including" a certain element, this signifies that the certain part may also include another element rather than excluding the other element unless particularly described otherwise, and this should not be understood as precluding the existence of or the possibility of adding one or more other features, numbers, steps, operations, elements, parts, or combinations thereof in advance.

In the present specification, "part" or "module" includes a unit realized by hardware, a unit realized by software, and a unit realized using both hardware and software. A single unit may be realized using two or more pieces of hardware, and two or more units may be realize using a piece of hardware. A "part" or "module" does not limitedly refer to software or hardware and may be configured to be in an addressable storage medium or configured to play one or more processors. Therefore, as an example, the "part" or "module" includes elements such as software elements, object-oriented software elements, class elements, and task elements, processes, functions, attributes, procedures, subroutines, and segments of program codes, drivers, firmware, micro-codes, circuits, data, databases, data structures, tables, arrays, and variables. Functions provided in such elements and "parts" (or "modules") may be combined with a smaller number of elements and "parts" (or "modules") or may be further divided into additional elements and "parts" (or "modules"). Furthermore, elements and "parts" (or "modules") may be implemented to play one or more central processing units (CPUs) in a device or a security multimedia card.

In an apparatus and method for tracking temporal variation of a context of video content according to an embodiment of the present disclosure which will be described below, a context of video content is defined with metadata tagged to a video, and changes in the context of the video content with time are tracked and analyzed. For this, in the apparatus and method for tracking temporal variation of a context of video content according to an embodiment of the present disclosure, metadata related to a first time point t1 is generated by utilizing static text data such as a script, a subtitle, and product placement information additionally generated when the video content is published, and when external data related to the video content is generated after the video content is published, the external data is additionally collected, and metadata is dynamically regenerated and tagged.

Hereinafter, the apparatus and method for tracking temporal variation of a context of video content according to an embodiment of the present disclosure will be described in detail with reference to the drawings.

Figure 1:
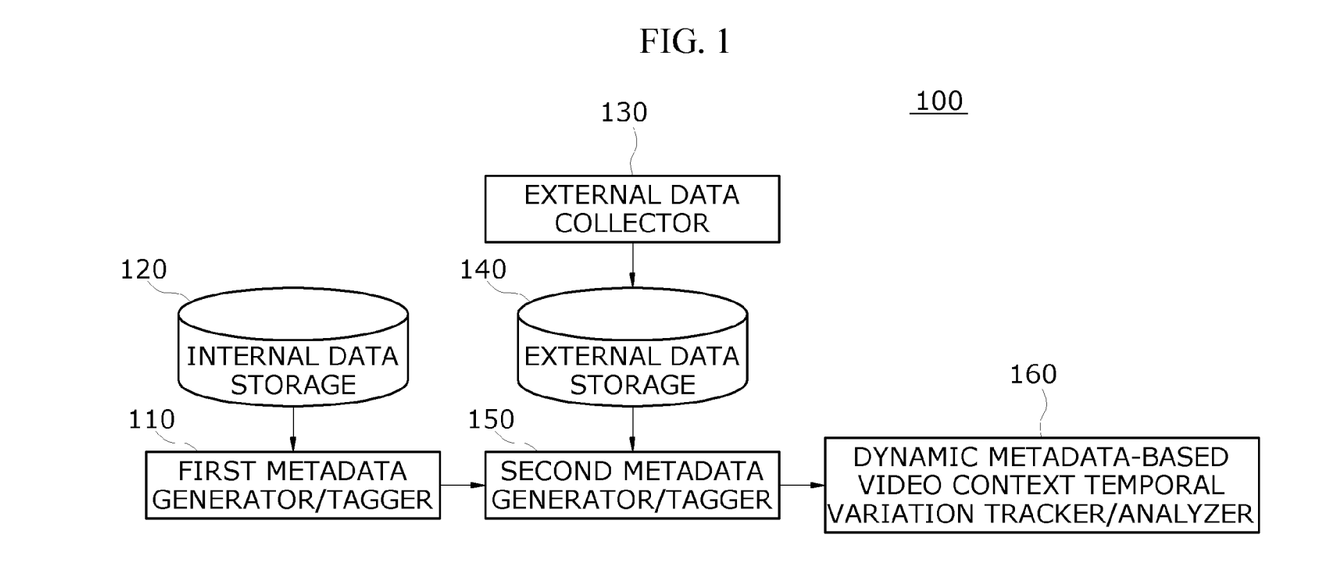
FIG. 1 is a block diagram of an apparatus for tracking temporal variation of a context of video content according to an embodiment of the present disclosure.

FIG. 1 is a block diagram of an apparatus for tracking temporal variation of a context of video content according to an embodiment of the present disclosure.

Figure 2:
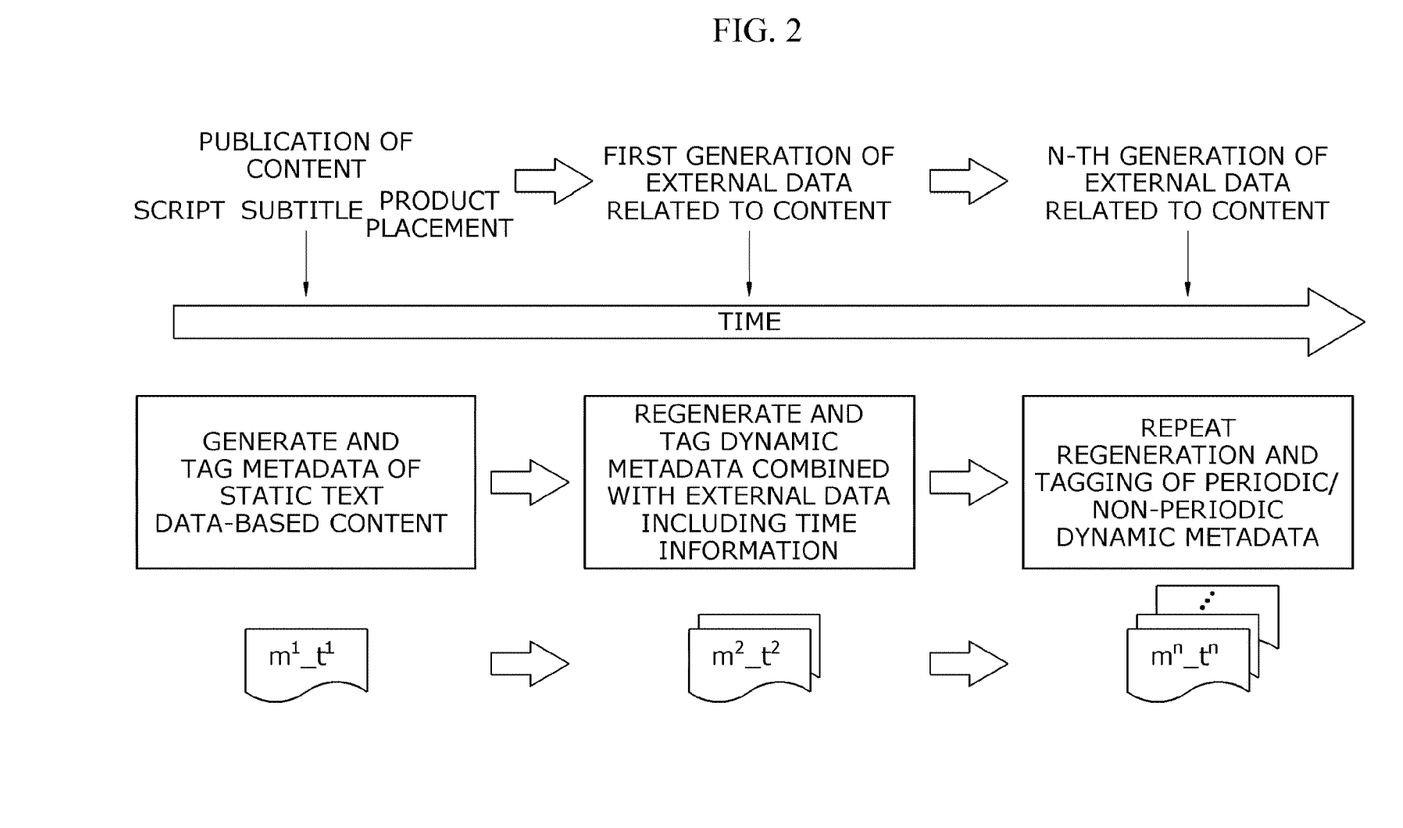
FIG. 2 is a conceptual diagram for describing a process of repeating regeneration and tagging of dynamic metadata related to video content according to an embodiment of the present disclosure.

FIG. 2 is a conceptual diagram for describing a process of repeating regeneration and tagging of dynamic metadata related to video content according to an embodiment of the present disclosure.

As illustrated in FIG. 1, an apparatus for tracking temporal variation of a video content context 100 includes a first metadata generator/tagger 110, an internal data storage 120, an external data collector 130, an external data storage 140, a second metadata generator/tagger 150, and a dynamic metadata-based video context temporal variation tracker/analyzer 160.

The first metadata generator/tagger 110 generates metadata (hereinafter referred to as "first metadata") on the basis of static text data published in generating video content and tags the generated first metadata to the corresponding video content.

A unit of video content for which the first metadata is generated and tagged includes a unit such as an entire episode or a partial, clipped video from the episode, but embodiments are not limited thereto.

Here, the first metadata generator/tagger 110 generates the first metadata on the basis of static text data published in generating video content including planning, shooting, and editing the video content (that is, before screening or broadcasting the video content).

The first metadata generator/tagger 110 may collect and utilize the static text data published in the generating of the video content and generate topics and keywords of the video content on the basis of the text data directly utilized in producing the video content. For example, the first metadata generator/tagger 110 may extract topics and keywords by learning a topic model on the basis of the collected text data.

The first metadata generator/tagger 110 acquires static text data published in the generating of the video content from the internal data storage 120.

Static text data preregistered for each of a plurality of pieces of video content is stored in the internal data storage 120, and the static text data may include data of original work, a storyboard, a script, a subtitle, product placement information, and the like generated in the planning, shooting, and editing of the video content.

Even after the video content is published to a user in the form in which the video content is screened or broadcasted, external data may be generated in various formats. For example, after video content such as a drama or documentary is broadcasted (that is, published), external text data is continuously generated in the form in which pieces of content related to various subject matters such as a historical background or knowledge related to a topic of the corresponding video content, a shooting place, current statuses of actors, and items worn by the actors are mentioned in blogs, social network service (SNS), and personal media channels. The apparatus for tracking temporal variation of a video content context 100 according to an embodiment of the present disclosure utilizes such external text data in analyzing trends of a context of a video.

The external data collector 130 collects external text data generated after the video content is published and stores the collected external text data in the external data storage 140. Also, the external data collector 130 may search for the external text data by inputting topics and keywords of static metadata and pre-generated dynamic metadata.

Here, the external data collector 130 collects external text data including time information at which text data is published in relation to any piece of video content. For example, the external data collector 130 continuously collects and stores external text data by searching media such as news, blogs, SNS, personal media channels online in real time or periodically using keywords.

The second metadata generator/tagger 150 regenerates dynamic metadata (hereinafter referred to as "second metadata") related to any piece of video content on the basis of the external text data collected by the external data collector 130 and tags the regenerated second metadata to the corresponding video content.

The second metadata generator/tagger 150 expands and updates topics and keywords of the static metadata using the collected external data and publication time information of the external data, and tags the second metadata, along with publication time information of the second metadata, to the video content.

For example, the second metadata generator/tagger 150 adds the external text data to the topic model generated on the basis of the pre-collected static text data and periodically/non-periodically re-learns the topic model. In the re-learning of the topic model as above, the existing topic model is updated, and new second metadata to which the latest trends are reflected is generated in addition to the first metadata contained in the video content.

The second metadata generator/tagger 150 combines newly-collected external data and generation time information of the data with a result learned with the topic model that is modeled during generation of the first metadata to regenerate the second metadata. Here, the dynamic metadata-based video context temporal variation tracker/analyzer 160 repeats regeneration/tagging of the second metadata using the periodically collected external text data at a time point at which the video content is being continuously screened or broadcasted and, when the screening or broadcasting of the video content is completed, regenerates/tags the second metadata using the non-periodically collected external text data.

Referring to FIG. 2, a process in which the dynamic metadata (that is, the second metadata) is regenerated and tagged is repeatedly performed after the static metadata (that is, the first metadata) is generated and tagged.

For example, metadata $m^1\_t^1$ is generated on the basis of static data such as a script, a subtitle, and product placement information generated at a time t1 at which video content is initially published. A topic model is learned on the basis of the static data collected as above, and topics and keywords are extracted.

Also, after the video content is published, external data (that is, dynamic data) such as SNS, blogs, news related to content of the video content is continuously generated. The external data generated in this way is continuously additionally collected on the basis of the metadata $m^1\_t^1$ for the first to nth times, and the collected external data is stored in the external data storage. Here, the stored external data is repeatedly used in a process in which the dynamic metadata is regenerated and tagged periodically or non-periodically. A unit of video content to which metadata is tagged includes a unit such as an entire episode or a partial, clip unit from the episode. A method for extracting a clip unit from an episode may be an automatic method, a semi-automatic method, or a manual method, but embodiments are not limited thereto.

Metadata is dynamically regenerated by utilizing the external data generated after the video content is published by utilizing the topic model based on the static data generated at the time point at which the video content is published, and the regenerated dynamic metadata includes temporal information. In this way, the dynamic metadata including temporal information may be generated by utilizing various pieces of external data across topics of the video content after the video content is published and re-learning the topic model learned on the basis of internal factors of the video content when the video content is initially programmed and broadcasted or screened. Here, how metadata representing a piece of video content is limited to a specific topic and then changes in accordance with a temporal variation feature may be tracked and content thereof may be analyzed.

The dynamic metadata-based video context temporal variation tracker/analyzer 160 defines a video context as metadata representing video content and tracks how the video context temporally changes when the dynamic metadata (that is, the second metadata) is regenerated.

For example, the dynamic metadata-based video context temporal variation tracker/analyzer 160 may analyze content of metadata contradictory to existing metadata resulting from reinterpretation of video content such as a drama or documentary that deals with a specific topic in accordance with social issues, viewers' opinions, and current statuses of actors with time and write a trend analysis report by tracking how an existing video context is temporally changing.

The first metadata and the second metadata described above with reference to FIGS. 1 and 2 may be stored and managed in a metadata storage (not illustrated), which is a separate storage space.

Hereinafter, a method for tracking temporal variation of a context of video content according to an embodiment of the present disclosure will be described with reference to FIG. 3.

Figure 3:
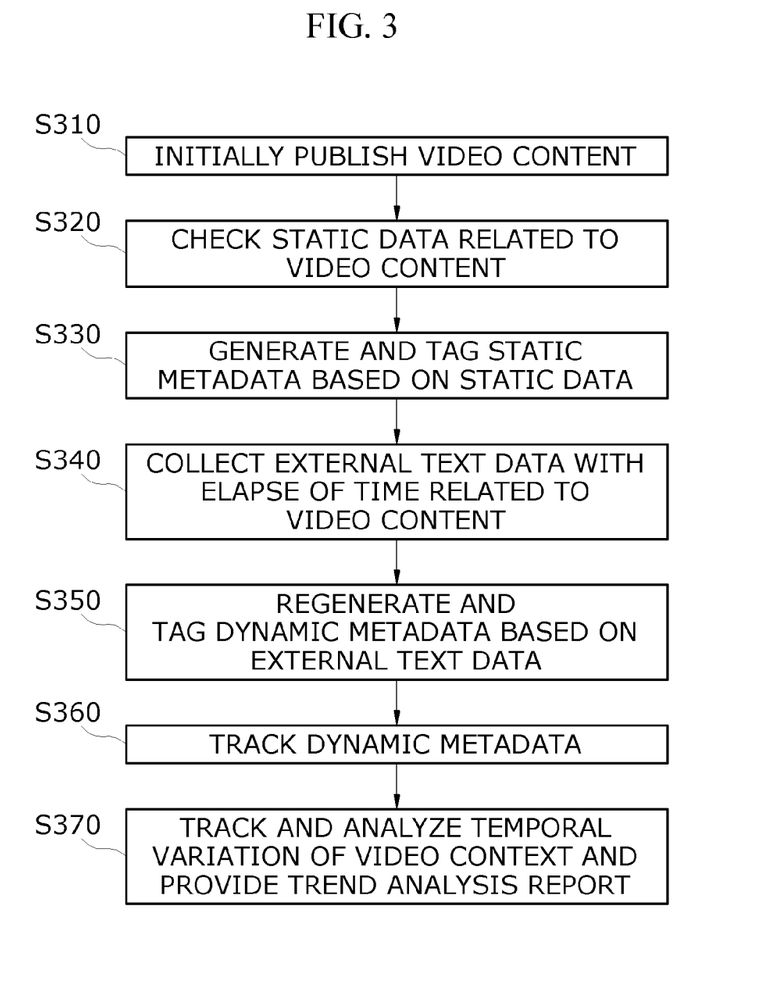
FIG. 3 is a flowchart for describing a method for tracking temporal variation of a context of video content according to an embodiment of the present disclosure.

FIG. 3 is a flowchart for describing a method for tracking temporal variation of a context of video content according to an embodiment of the present disclosure.

As illustrated in FIG. 3, when video content is initially published first (S310), static data set in relation to the video content is checked (S320).

Then, static metadata based on the static data of the video content is generated and tagged to the video content (S330).

Then, external text data is repeatedly collected on the basis of the static metadata with time after the video content is published (S340).

Then, dynamic metadata is regenerated on the basis of the external text data at every time point at which the external text data is collected, and the regenerated dynamic metadata is tagged to the video content (S350).

Then, the regenerated dynamic metadata is periodically or non-periodically tracked in accordance with temporal variation (S360).

Then, temporal variation of a video context is tracked on the basis of a result of tracking the dynamic metadata in accordance with the temporal variation, a result thereof is analyzed, and a trend analysis report is generated and provided (S370).

An intelligent marketing analysis method using an intelligent marketing analysis system by processing unstructured big data according to an embodiment of the present disclosure described above may be implemented in the form of a computer program stored in a medium executed by a computer or a recording medium including computer-executable instructions. Such a recording medium may be a computer-readable medium that includes any computer-accessible available media, volatile and nonvolatile media, and removable and non-removable media. The computer-readable medium may also include a computer storage medium, and the computer storage medium includes volatile and nonvolatile media and removable and non-removable medium implemented with any method or technology for storing information such as a computer-readable instruction, a data structure, a program module, and other data.

Although the method and system of the present disclosure have been described in relation to particular embodiments, elements or operations thereof may be partially or entirely implemented using a computer system having a universal hardware architecture.

The description of the present disclosure given above is merely illustrative, and one of ordinary skill in the art to which the present disclosure pertains should understand that the present disclosure may be easily modified in other specific forms without changing the technical spirit or essential features of the present disclosure. Therefore, the embodiments described above are merely illustrative in all aspects and should not be understood as limiting. For example, each element described as a single element may be distributed into a plurality of elements, and likewise, elements described as being distributed may be combined into a single element.

According to any one aspect of the present disclosure, because topic model-based metadata used to search for a meaning that video content implies changes with time, external data continuously generated after the video content is published is utilized in a topic model in addition to static text data generated in an initial publication of the video content.

In this way, by using metadata of video content that is dynamically regenerated and tagged in accordance with temporal variation of a context of the video content, new metadata related to video content published before a predetermined amount of time can be generated in accordance with new issues and trends, and the corresponding video content can be searched for or utilized in accordance with the latest issues.

Figure 4:
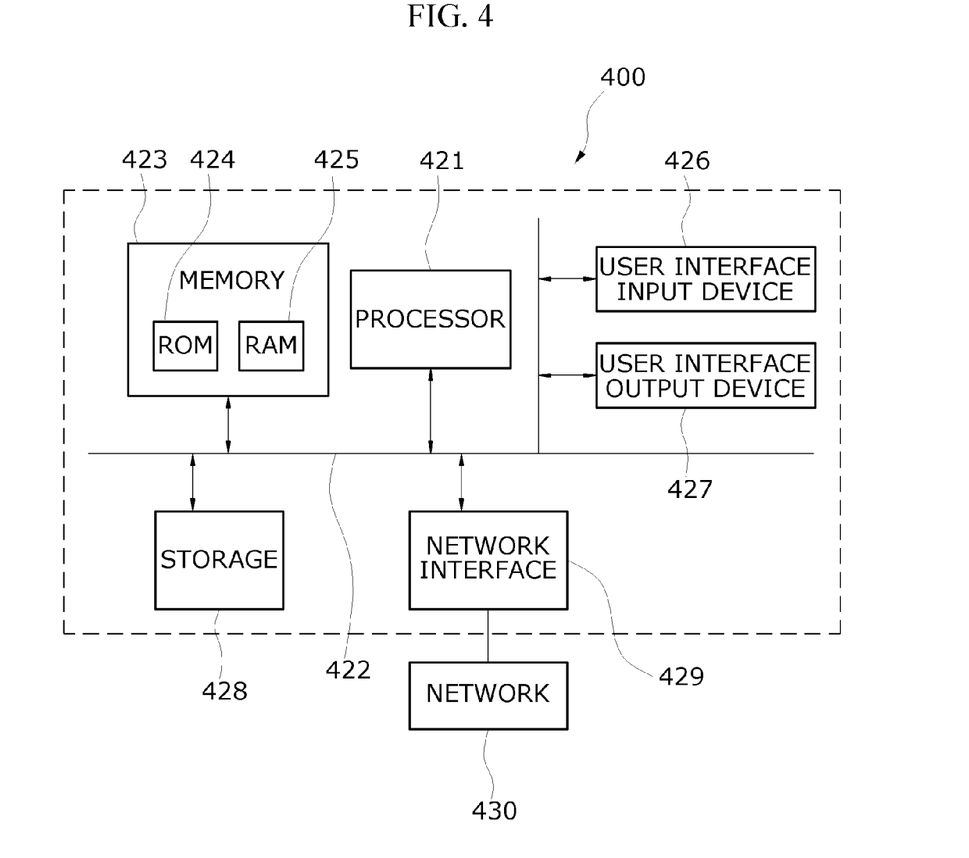
FIG. 4 is a view illustrating an example of a computer system in which a method according to an embodiment of the present invention is performed.

The method according to an embodiment of the present invention may be implemented in a computer system or may be recorded in a recording medium. FIG. 4 illustrates a simple embodiment of a computer system. As illustrated, the computer system may include one or more processors 421, a memory 423, a user input device 426, a data communication bus 422, a user output device 427, a storage 428, and the like. These components perform data communication through the data communication bus 422.

Also, the computer system may further include a network interface 429 coupled to a network. The processor 421 may be a central processing unit (CPU) or a semiconductor device that processes a command stored in the memory 423 and/or the storage 428.

The memory 423 and the storage 428 may include various types of volatile or non-volatile storage mediums. For example, the memory 423 may include a ROM 424 and a RAM 425.

Thus, the method according to an embodiment of the present invention may be implemented as a method that can be executable in the computer system. When the method according to an embodiment of the present invention is performed in the computer system, computer-readable commands may perform the producing method according to the present invention.

The method according to the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

The scope of the present disclosure is defined by the claims below rather than the detailed description above, and all changes or modifications derived from the meaning and the scope of the claims and their equivalents should be interpreted as belonging to the scope of the present disclosure.

What is claimed is:

1. An apparatus for tracking temporal variation of a video content context, the apparatus comprising:
a processor configured to:
generate static metadata based on internal data held during an initial publication of video content,
tag the generated static metadata to the video content,
collect external data related to the video content generated after the video content is published,
generate dynamic metadata related to the video content based on the collected external data,
tag the generated dynamic metadata to the video content,
regenerate the dynamic metadata with an elapse of time,
tag the regenerated dynamic metadata to the video content,
track a temporal change in context of the regenerated dynamic metadata from the generated dynamic metadata, and
generate and provide a trend analysis report of a context of the video based on the tracked temporal change in the context of the regenerated dynamic metadata,
wherein the processor comprises:
a first metadata generator/tagger configured to generate the static metadata based on the internal data held during the initial publication of the video content, and tag the generated static metadata to the video content,
an external data collector configured to collect the external data related to the video content generated after the video content is published,
a second metadata generator/tagger configured to generate dynamic metadata related to the video content based on the collected external data, and tag the generated dynamic metadata to the video content, and
a dynamic metadata-based video context temporal variation tracker/analyzer configured to regenerate the dynamic metadata with the elapse of time, tag the regenerated dynamic metadata to the video content, track the temporal change in context of the regenerated dynamic metadata from the generated dynamic metadata, and generate and provide the trend analysis report of the context of the video based on the tracked temporal change in the context of the regenerated dynamic metadata,
wherein the second metadata generator/tagger is further configured to expand and update topics and keywords of the static metadata using the collected external data and publication time information of the collected external data, and tag other metadata, along with publication time information of the other metadata, to the video content.

2. The apparatus of claim 1, wherein the first metadata generator/tagger is further configured to generate the static metadata by extracting topics and keywords based on static text data including any one or any combination of any two or more of a script, a subtitle, product placement information, and a storyboard pre-generated at a time point at which the video content is initially published.

3. The apparatus of claim 1, wherein the external data collector is further configured to search for the external text data by inputting topics and keywords of the static metadata and pre-generated dynamic metadata, and store the collected external text data in an external data storage.

4. The apparatus of claim 1, wherein the dynamic metadata-based video context temporal variation tracker/analyzer is further configured to regenerate the dynamic metadata, tag the regenerated dynamic metadata by using periodically collected external text data at a time point at which the video content is continuously screened or broadcasted and, in response to the screening or broadcasting of the video content being completed, regenerate and tag the dynamic metadata using non-periodically collected external text data.

5. A processor-implemented method for tracking temporal variation of a video content context using dynamic metadata, the method comprising:
    generating static metadata based on internal data held during an initial publication of video content;
    tagging the generated static metadata to the video content;
    collecting external data related to the video content generated after the video content is published;
    generating dynamic metadata related to the video content based on the collected external data;
    tagging the generated dynamic metadata to the video content; and
    regenerating the dynamic metadata with an elapse of time;
    tagging the regenerated dynamic metadata to the video content;
    tracking a temporal change in context of the regenerated dynamic metadata from the generated dynamic metadata; and
    generating and providing a trend analysis report of a context of the video based on the tracked temporal change in the context of the regenerated dynamic metadata,
    wherein the generating of the dynamic metadata includes expanding and updating topics and keywords of the static metadata using the collected external data and publication time information of the collected external data, and tagging other metadata, along with publication time information of the other metadata, to the video content.

6. The method of claim 5, wherein the generating of the static metadata and the tagging of the generated static metadata include generating the static metadata by extracting topics and keywords based on static text data including any one or any combination of any two or more of a script, a subtitle, product placement information, and a storyboard pre-generated at a time point at which the video content is initially published.

7. The method of claim 5, wherein the collecting of the external data includes searching for the external text data by inputting the topics and the keywords of the static metadata and pre-generated dynamic metadata.

8. The method of claim 5, wherein the regenerating of the dynamic metadata includes repeating regeneration and tagging of the dynamic metadata using periodically collected external text data at a time point at which the video content is continuously screened or broadcasted and, in response to the screening or broadcasting of the video content being completed, regenerating and tagging the dynamic metadata using non-periodically collected external text data.

9. The method of claim 5, wherein the static metadata is generated using topic modeling in machine learning.

10. The method of claim 5, wherein the dynamic metadata is regenerated through topic extension by collecting the external data.

* * * * *